US008274508B2

(12) United States Patent
Porikli et al.

(10) Patent No.: US 8,274,508 B2
(45) Date of Patent: Sep. 25, 2012

(54) METHOD FOR REPRESENTING OBJECTS WITH CONCENTRIC RING SIGNATURE DESCRIPTORS FOR DETECTING 3D OBJECTS IN RANGE IMAGES

(75) Inventors: Fatih Porikli, Watertown, MA (US); Hien Nguyen, College Park, MD (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 2 days.

(21) Appl. No.: 13/026,382

(22) Filed: Feb. 14, 2011

(65) Prior Publication Data

US 2012/0206438 A1 Aug. 16, 2012

(51) Int. Cl.
*G06T 15/00* (2011.01)
(52) U.S. Cl. ........ 345/419; 382/170; 382/199; 382/224; 702/150; 707/999.102; 707/955; 710/52; 711/200; 711/208
(58) Field of Classification Search .................. 345/419; 382/199, 170, 224; 707/999.102, 955; 702/150; 711/200, 208
See application file for complete search history.

(56) References Cited

U.S. PATENT DOCUMENTS

| 6,400,846 | B1* | 6/2002 | Lin et al. ..................... 382/199 |
| 7,031,875 | B2* | 4/2006 | Ellenby et al. ............... 702/150 |
| 7,856,125 | B2 | 12/2010 | Medioni |
| 2006/0161379 | A1* | 7/2006 | Ellenby et al. ............... 702/150 |
| 2008/0310757 | A1 | 12/2008 | Wolberg |
| 2009/0110301 | A1* | 4/2009 | Schopp et al. ............... 382/224 |
| 2011/0235922 | A1* | 9/2011 | Chertok et al. ............... 382/199 |
| 2011/0255781 | A1* | 10/2011 | Hamsici et al. ............... 382/170 |
| 2011/0273442 | A1* | 11/2011 | Drost et al. ................... 345/419 |

OTHER PUBLICATIONS

Horaud "Matching 3-D Objects with Single Perspective Views", May 1987.*
Tan et al. "Introduction to Data Mining". Published Apr. 18, 2004.*
Lepetit et al. "Point Matching as a Classification Problem for Fast and Robust Object Pose Estimation", IEEE 2004.*
Pathak et al. "Fast Registration Based on Noisy Planes with Unknown Correspondeces for 3-D Mapping". IEEE 2010.*

* cited by examiner

*Primary Examiner* — Kimbinh T Nguyen
(74) *Attorney, Agent, or Firm* — Dirk Brinkman; Gene Vinokur

(57) ABSTRACT

A 3D object is represented by a descriptor, wherein a model of the 3D object is a 3D point cloud. A local support for each point p in the 3D point cloud is located, and reference x, y, and z axes are generated for the local support. A polar grid is applied according to the references x, y, and z axes a along an azimuth and a radial directions on an xy plane centered on the point p such that each patch on the grid is a bin for a 2D histogram, wherein the 2D histogram is a 2D matrix F on the grid and each coefficient of the 2D matrix F corresponds to the patch on the grid. For each grid location (k, l), an elevation value F(k, l) is estimated by interpolating the elevation values of the 3D points within the patches to produce the descriptor for the point p.

20 Claims, 6 Drawing Sheets

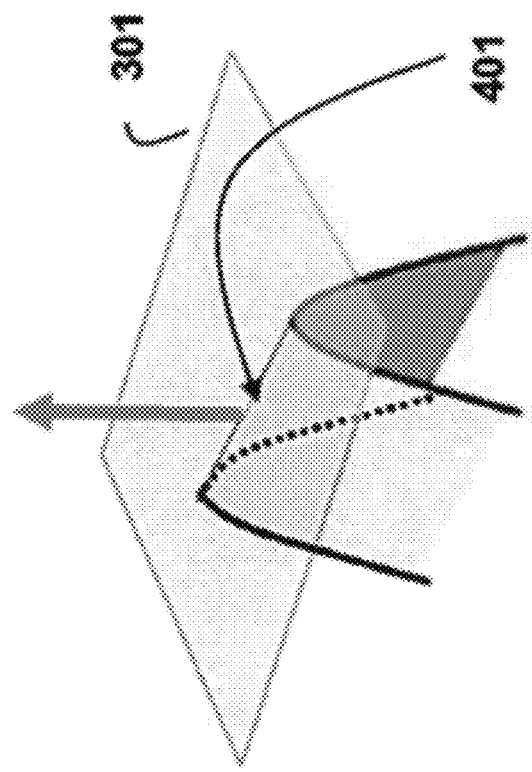
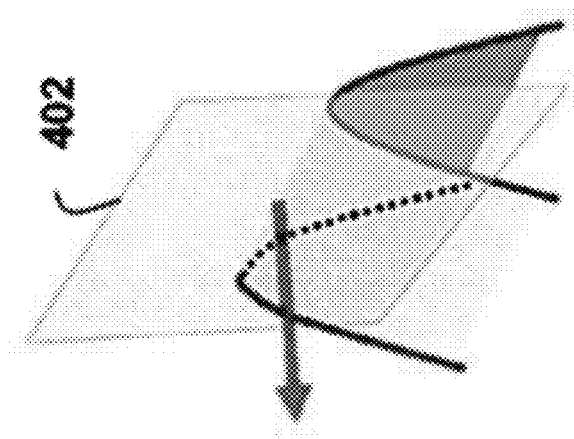
Fig. 4A
Fig. 4B

METHOD FOR REPRESENTING OBJECTS WITH CONCENTRIC RING SIGNATURE DESCRIPTORS FOR DETECTING 3D OBJECTS IN RANGE IMAGES

FIELD OF THE INVENTION

This invention relates representing objects with descriptors, and more particularly to detecting objects in 2.5D range images using the descriptors.

BACKGROUND OF THE INVENTION

Using a database of 3D models of objects, it is desired to provide a method for detecting objects in a query 2.5 D range image acquired by a scanner of a 3D scene. In the 2.5D range image, every scanned point (pixel) (x, y) on a surface of an object is associated with one depth value z, i.e., where z is the distance from the scanner to the point.

Object Detection

As defined herein, object detection generally includes object shape matching, object recognition, and object registration.

Point Cloud

A point cloud is a set of vertices in a three-dimensional coordinate system. The vertices are usually defined by (x, y, z) coordinates, and typically represent the external surface of the object. The point clouds used herein are generated by a scanner. Scanners automatically measure distances to a large number of points on the surface of the object, and output the point cloud as a data file. The point cloud represents the set of points measured by the scanner. Point clouds are used for many purposes, including object detection as defined herein.

Prior art object detection methods generally assume the availability of a 3D surface mesh, and complete 3D models, and therefore those methods cannot be readily extended to 2.5 range images. It is a difficult to detect a 3D object in 2.5 D range images for the following reasons.

Parts of objects can be obscured due to self-occlusion, or occlusion by other objects. Scanners, at most, can only acquire a 180° degree view of a 360° 3D scene, i.e., only half of the scene is visible in the range image at most.

Nearby objects can also act as background clutter interfering with the detection method. Viewpoint and scale changes exhibit high appearance variation and ambiguity. This variation sometimes goes well beyond inter-class changes contributing to the detection inaccuracy.

Range Images

Range scanners have a limited spatial resolution because the surface is only scanned at discrete points, and fine details in the objects is usually lost or blurred. For some scanners, the sampling resolution varies greatly along different axes, and re-sampling of a 3D point clouds is difficult and possibly leads to distortion of the surface topology.

High-speed range scanners introduce significant noise in the range measurement, causing parts of the scene having incomplete observations.

Regardless of the above difficulties, the use of scanner generated point clouds has become increasingly popular due to many advantages over traditional optical counterparts, such as conventional cameras. In general, methods for 2.5 range images are generally illumination-invariant, because only geometric distances matter.

Feature Descriptor

The most popular object descriptors for object detection methods are feature-based, which require compact and effective 3D descriptors. The efficacy of those methods is based on several criteria including discriminative power, rotation invariance, insensitivity to noise, and computational efficiency.

Feature-based methods can be partitioned into the following categories depending on a size of the support regions: global descriptors, regional descriptors, and local descriptors. However, local descriptors are not useful for recognition and detection from discretely scanned points because the estimate of local properties such as surface normals, or curvature from a set of discrete sample points, is very unstable.

Global Descriptors

An extended Gaussian image (EGI) is among the most popular global descriptor. EGI maps weighted surface normals to a Gaussian sphere, which forms a 2D image. The simplicity of this descriptor comes at the cost of a loss of local geometry information.

A shape distribution method randomly samples pair-wise distances of points and forms a histogram representing the overall shape. This descriptor is advantageous because it can be determined quickly, and does not require pose normalization, feature correspondence, or model fitting.

Other global shape features include superquadratic, spherical attribute images, and the COllaborative System based on MPEG-4 Objects and Streams, (COSMO). Global shape descriptors are generally more discriminative because they use the entire model. On the other hand, these models are very sensitive to clutter or occlusion.

Regional Descriptors

Among regional descriptors, a spin image is effective in many 3D applications. The spin image considers a cylindrical support region whose center at the basis point p and its north pole oriented with the surface normal estimate at point p. The two cylindrical coordinates are: radial coordinate $\alpha$, perpendicular distance to the center, and elevation coordinate $\beta$, perpendicular signed distance to the tangent plane going through the point p. The spin image is constructed by accumulating points within volumes indexed by $(\alpha, \beta)$. Other regional descriptors include surface splashes and super segments.

A 3D shape context is similar to the spin image except that the support region is a sphere. The sphere is segmented into sub-volumes by partitioning the sphere evenly along the azimuth and elevation dimensions, and logarithmically in the radial dimension. The accumulation of weights for each sub-volume contributes one histogram bin. A degree of freedom in the azimuth direction is removed before performing feature matching. A spherical harmonic can be applied to the shape context to make it rotation-invariant. That method is called spherical shape context.

A point signature represents local topologies by distances from 3D curves to a plane. Although less descriptive than the spin image or the shape context, this 1D descriptors is advantageous in the sense that it is quick to determined and easy to match. It does not require normal estimate like the spin image, which can be erroneous when the point density is insufficient. It also does not vary with pose like the shape context. In addition, a combination of signatures across different scales can produce a more complete descriptors.

Given numerous available 3D descriptors, it makes sense to select a descriptor having feature that best fit an application. It is sometimes more efficient to combine different type of features and allow each feature to contribute at different stages in an application.

For example, spin images and EGI have been combined in a top-down and bottom-up manner. That method first classifies points as an object or background using spin images. Connected components of neighboring object points are then extracted. Constellation EGIs facilitates the fast alignment and matching of EGIs of connected components to a model database. This provides a good trade-off between efficiency and accuracy for detecting cars and other objects in a large dataset. Principal curvature and point signature have also been combined for 3D face recognition.

Arrangement of features along the detection and recognition cascade is dictated mostly by heuristic rules. For each query image, there can be hundreds of thousands of points. The huge amount of data requires efficient techniques for retrieving the best matches from the model database. One method uses principle component analysis (PCA) to determine a subspace of spin images.

Another method uses quantization and clusters the feature space. That method uses k representative clusters to facilitate fast d-dimension feature retrieval, where k is substantially smaller than d. That method can partially match of objects by projecting a query histogram onto object subspaces. A coarse-to-fine approach can further reduce the amount of computation. Only a small subset of features is selected from the query image to compare with the models in the database. The selection can be random, based on local topologies such as curvatures or normal directions, or data driven. The matching qualities of features to the models dictate a short list of candidate positions. At the end of the coarse-to-fine chain, there are fewer candidate objects, therefore more complex search and geometric constraints can be enforced.

Another method for feature retrieval uses hashing. Geometric hashing. That method combines invariant coordinate representations with geometric coordinate hashing to prune a model database using simple geometric constraints. That method is polynomial in the number of feature points. A sublinear feature retrieval method uses locality sensitive hashing (LSH), which is a probabilistic nearest neighbor search. In that method features are determined at salient points on surfaces. LSH hashes features into bins based on probability of collision so that similar features hash to same bucket.

Point Signature

A point signature (PS) is a shape descriptor based on a 3D space curve formed by an intersection between a sphere centered at a center point and the surface of the object. The PS is fast to determined, and easy to match with the models. However, PS lacks sufficient discriminant power for reliable matching.

Other combinations of shape descriptors such as the spin image, shape context, and their spherical harmonics are effective in many applications. In contrast to the over-simplification of the PS, those descriptors store a weight proportional to the number of points in a given volume. Those descriptors can be categorized as volume-based descriptors, which inevitably lead to high redundancy because of the nature of range images, which are necessarily sparse. In addition, spin image and shape context require an estimation of normal vector at local points, which can be error-prone if the spatial resolution is low.

SUMMARY OF THE INVENTION

A 3D object is represented by a descriptor, wherein a model of the 3D object is a 3D point cloud.

A local support for each point p in the 3D point cloud is located, and reference x, y, and z axes are generated for the local support.

A polar grid is applied according to the references x, y, and z axes a along an azimuth and a radial directions on an xy plane centered on the point p such that each patch on the grid is a bin for a 2D histogram, wherein the 2D histogram is a 2D matrix F on the grid and each coefficient of the 2D matrix F corresponds to the patch on the grid.

For each grid location (k, l), an elevation value F(k, l) is estimated by interpolating the elevation values of the 3D points within the patches to produce the descriptor for the point p.

BRIEF DESCRIPTION OF THE DRAWINGS

FIG. 4A is a schematic of a plane to a perimeter of the object according to embodiments of the invention;

FIG. 4B is a schematic of fitting to a local neighborhood results in a slicing plane according to embodiments of the invention.

DETAILED DESCRIPTION OF THE PREFERRED EMBODIMENTS

The embodiments of our invention provide a method for representing a 3D object with a descriptor, and detecting similar objects in a query 2.5D range images using the descriptor. The 2.5 range images can be acquired by a scanner. The 3D object is modeled by a 3D point cloud. As defined herein, object detection generally includes object shape matching, object recognition, and object registration, and a point cloud is defined a set of vertices in a three-dimensional coordinate system (x, y, z) intended to be representative of an external surface of the object. More specifically, the point cloud is sparse, see U.S. patents and Publication U.S. Pat. No. 7,605,81 7,856,125, and 20080310757.

We describe a 3D descriptor, which represents local topologies within a set of folded concentric rings, by distances from local data points to a projection plane. We call this descriptor a Concentric Ring Signature (CORS). The CORS are stored in a database and associated with the corresponding 3D models.

In contrast with spin images, our CORS does not require estimating the point normal. Therefore, the CORS is directly applicable to a sparse cloud of discretely sampled points, particularly when the density of the points in the cloud is insufficiently low as in range images for conventional detection methods. In addition, our CURS produces a more compact and dense descriptor vector than point signatures (PS) and spin images, which makes it more robust to noise, incomplete data and occlusion.

The discriminative power of our CORS is superior to the point signature producing about twice as many good estimates with the percentage of correct match scores improving from 39% to 88%. This quality also is also observed for 3D object detection and alignment in 2.5D images.

With CORS, object scales can be well estimated, thus eliminating searching across different scales. In addition, our 3D models do not require multiple snapshots at different views for color image detection. Only a small number of models need to be stored in the database for each class of objects. This enables the system to scale up with the number of classes when it is desired to detect multiple objects in the query images.

Our method includes the following basic steps. We determine concentric ring signatures (CORS) for a subset of uniformly distributed points in a query 2.5D range image of a scene including an object. We determine correspondences between CURS extracted from the query image, and CORS stored with the 3D models in the database. This step can be accelerated by a shape representation. Then, the object is detected using geometric constraints.

Concentric Ring Signature

Figure 1:
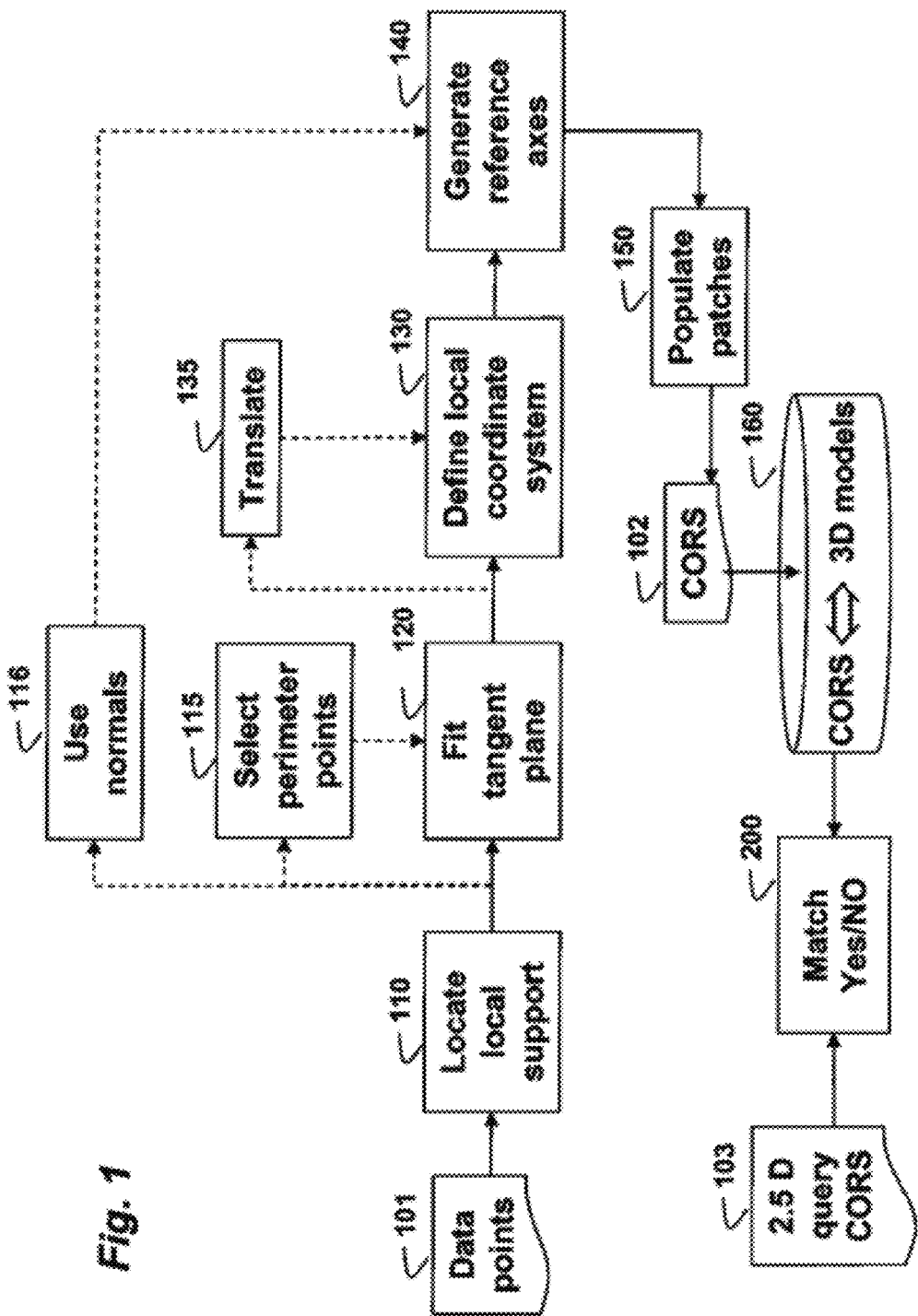
FIG. 1 is a flow diagram of a method for representing an object with a concentric ring signature (CORS) as a descriptor of the object according to embodiments of the invention.

FIG. 1 shows a method to construct CORS as a descriptor for objects according to embodiments of the invention, which are described in detail below.

Figure 3:
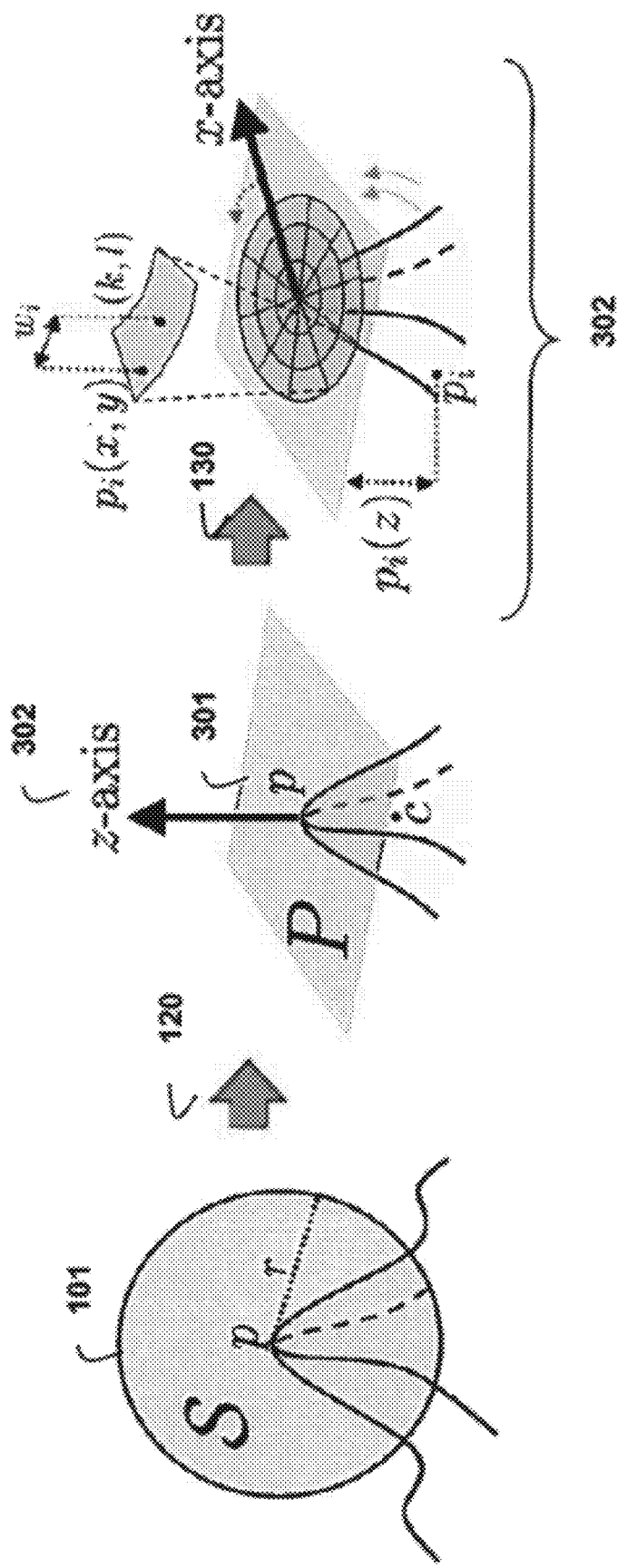
FIG. 3 is a schematic of a spherical cloud of 3D data points, determining a plane of projection, and determine a reference orientation for plane according to embodiments of the invention.

First, we described the overall concept of CORS schematically in FIG. 3.

Input to the method is a spherical "cloud" of 3D data points p $101$, which is the model of the object. A local support S for each point p is a spherical volume of points $p_i$ centered on the point p with a radius r. We locate 3D data points within the local support region S. Then, we determine a plane of projection $301$, and determine a reference orientation $302$ in that plane. Finally, we determine the patch responses that are arranged into a matrix form. The plane P is fitted to local neighborhood and translated $135$ to the point p. The other variables are as described herein.

The normal direction is taken to be z-axis $302$. Next, a reference orientation is selected for x-axis and projecting the distances from the surface to plane into the corresponding patches.

Local Support

Let p be a data point in the 3D point cloud $101$. A spherical volume S of points $p_i$, centered on each point p and within a radius r of the point p, is defined as the local support for the point p according to $$S=\{p_i : \|p_i-p\| \leq r\}.$$

The radius r is data dependent. For example, a larger radius is preferred for smooth and rigid shapes, while a smaller radius is preferred for shapes with articulations, or structural variations. As r increases, the CORS is more discriminative but more vulnerable against occlusions. A good choice of the radius r balances these two factors.

Plane of Projection and Reference Axes

A tangent plane P $301$ is fitted $120$ to the local support S. There are two possible choices for plane fitting. One can use the all points $p_i$ within the local support $110$, fit a plane by least-squares as the system is almost always over-determined, and translate $135$ the origin of the plane P at point p along a normal direction. Alternatively as shown in FIG. 1, it is possible to select $115$ a subset of points along a perimeter of the local support, e.g. intersecting the sphere support with the object surface.

As shown in FIGS. 4A-4B, fitting the plane $301$ to the perimeter would be more appropriate particularly for the points along a ridge $401$. In a special case, a plane is fitted to local support is different from fitting a plane to its perimeter. Fitting to the perimeter results in a tangent plane is shown in FIG. 4A, while fitting to the entire local neighborhood results in a slicing plane $402$ shown in FIG. 4B. It is more meaningful for the plane of projection to be tangent to the surface rather than slice into it as our descriptor is based on elevations of points. In case the projection plane slices into the surface, the resulting descriptor would be zero.

We define $130$ a local reference coordinates so that the descriptor for the local support is invariant of a camera viewing angle. Let c be the Karcher mean, that is the coordinate having the minimal overall distance to the other points in the local support $$c=\arg\min \Sigma_i \|p_i - c\|.$$

The translate operation $135$ moves the origin of the fitted plane P to the point p by shifting, i.e., a parallel translating, the plane along the normal direction of the plane P. In other words, the (0, 0) coordinate of the plane P coincides with p.

To generate $140$ the reference axes, we set the z-axis to be orthogonal to the plane P. The z-axis points in a direction, such that the dot product of the unit vector z with a vector cp is positive. The vector cp connects the Karcher mean point c to the point p in the local support, We generate $140$ the local reference axis (x-axis) so that the local descriptor is invariant of a viewing angle. The x-axis points away from p to the projection of the 3D point that has the maximum distance from the fitted plane P within the local support S. The y-axis is defined by the cross product zx. With such assignments, the plane P corresponds to the xy plane going through point p. These two conditions define the z-axis without any ambiguity.

In case the projection distances from the plane P to the xy plane have more than one peak, multiple reference axes can be generated. When this situation occurs during a training phase, multiple CORS descriptors, each corresponds to one peak, are determined, and stored in the database $160$ and associated with the 3D models.

The steps of the method can be performed in a processor connected to memory and input/output interfaces as known in the art.

During the matching $200$, only one descriptor corresponding to the largest peak is needed for each query point in the 2.5 D query image, even when the projection distances have multiple similarly large peaks. The reason is because the query descriptor $103$ can always determine the correct match in the model database when multiple descriptors have been generated to take into account ambiguity of peaks. We observe that this situation occurs at only around 1% of points and the inclusion of multiple peaks improves matching of descriptors.

Populating Patches

After fitting the plane and generating the reference axes referring again to FIG. 3, each 3D point $p_i$ in the local neighborhood S is now represented by a tensor $p_i(x, y, z)$ in a form of a multidimensional array of numbers. The tensor is invariant of the camera viewing angle. The z-coordinates $p_i(z)$ correspond to the distance from the plane in this tensor, and the xy-plane coordinates $p_i(x, y)$ correspond to the projection on the plane P.

Next, we populate $150$ patches defined on a grid using the references x, y, and z axes. We estimate a representative elevation value of the given data points within patches on the grid as follows:

1) We apply a polar grid along an azimuth and a radial directions on a xy plane centered on the point p. Each patch on the grid is a bin for a 2D histogram. Let $\{(k, l)\}$ be the set of sampled grid locations with $k=1, \ldots, K$ and $l=1, \ldots, L$, where K and L are the numbers of sampling intervals along the azimuth and the radial directions, respectively. In other words, we extract a 2D matrix F on this grid where each coefficient of the matrix f corresponds to the patch on the grid.

2) For each grid location (k, l), we estimate an elevation value F(k, l) to produce the descriptor for the point.

The representative elevation value F(k, l) is estimated as follows:

$$F(k, l) = \frac{\sum_i w_i \cdot p_i(z)}{\sum_i w_i}$$

where $p_i$ are 3D points within the immediate neighboring bins of the bin of (k, l) and the weight is determined as:

$$w_i = \begin{cases} \frac{1}{\alpha}, & d \le \alpha \\ \frac{1}{d}, & \alpha \le d \le 2\alpha \\ 0, & \text{otherwise} \end{cases}$$

$$d = \|(k, l) - p_i(x, y)\|.$$

The elevation value F(k, l) is a weighted average of elevation of points surrounding the grid location (k, l). The contribution of each surrounding point's elevation to the estimation of representative elevation is controlled by a weight $w_i$, which is negatively proportional to the distance to (k, l).

Parameter α controls a smoothness of the descriptor. Higher α values yield smoother descriptors, while smaller α makes the descriptor sensitive to positional translations. The parameter α depends on the sampling interval along the azimuth and radial directions. We observed that the average Euclidean distance between bin centers and their adjacent bins is a satisfactory value. Using a fixed parameter a makes bins near to the origin in a polar coordinate system more similar than those further away. The parameter α can be set in an adaptive manner to overcome this issue. Also, imposing a minimum distance constraint improves accuracy when small differences in shape are near the center.

In addition to the mean orthogonal distance from S to the P, the standard deviation of the projection distances and the density of points falling into each bin also possess complementing discriminant power and can be incorporated into similar matrices. An advantage of the mean distance is that it does not require point density estimation and normalization.

Figure 5:
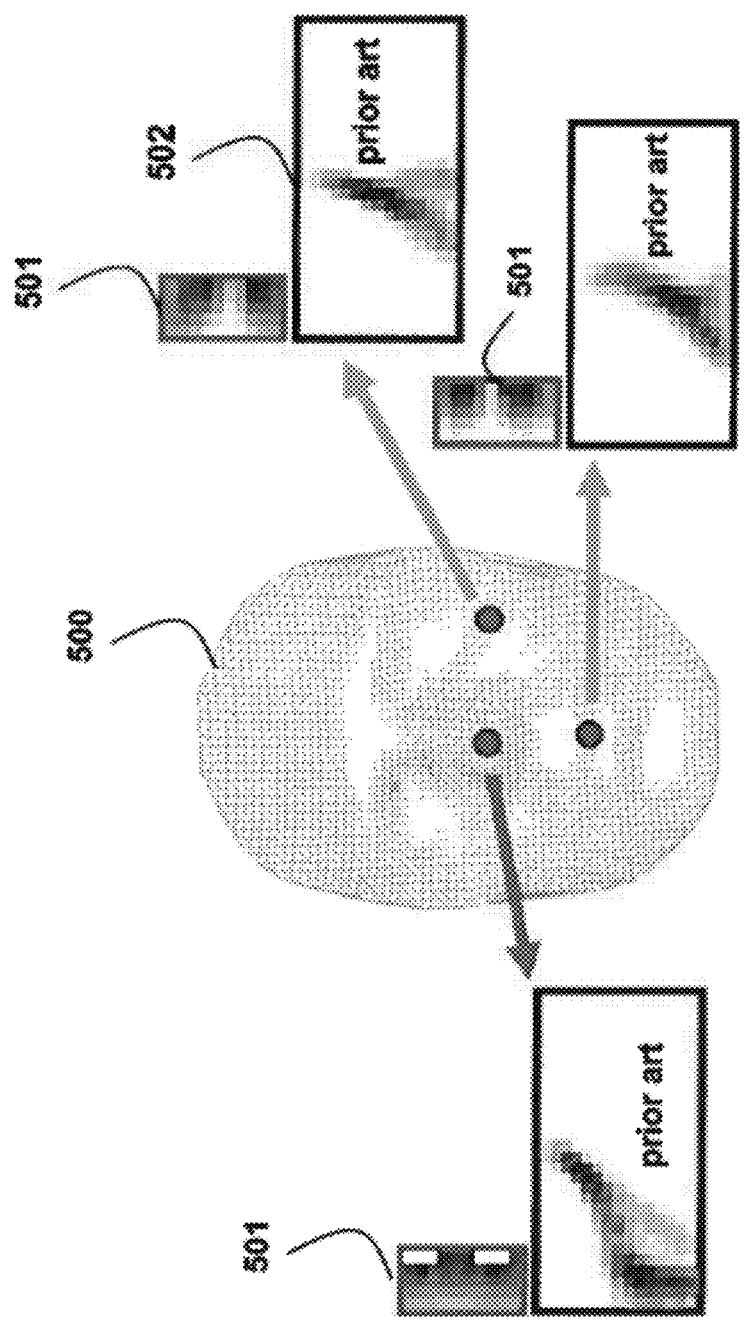
FIG. 5 is a schematic of CORS determined at different locations on a 3D data cloud of human face where CORS has a smaller rectangular shape and a prior art spin image has larger rectangular shape.

FIG. 5 provides a visual illustration of CORS determined at different locations on a 3D data cloud of human face 500 where CORS according to the embodiments of the invention is a smaller rectangular shape 501 representing a 2D matrix, and prior art spin image is a larger rectangular shape 502.

The radius of support region is set to 15 for both descriptors. The number of azimuth and radial quantization of CORS are 10 and 5, respectively. The bin size of the spin image is set to equal to the scanner resolution. Note that the dimension of CORS is 6.5 times smaller than that of the prior art spin image. Such dimensional reduction increases the descriptors matching efficiency, yet does not compromise the discriminative power.

Fast Approximation of CORS

In practice, the computational time of CORS can be significantly reduced by just using 116 a normal of the local support, whenever available, as the z-axis of the local reference frame. This eliminates the need of fitting a plane to the neighborhood at every location.

To speed up the matching of a CORS descriptor to large databases (hundreds of thousands of signatures), a coarse-to-fine approach can be adapted. For each CORS descriptor, we row-sum up all elements of the K*L matrix, i.e., those lying on the same ring to create a subordinate signature. This can be used for quickly pruning unlikely candidates.

Matching

Figure 2A:
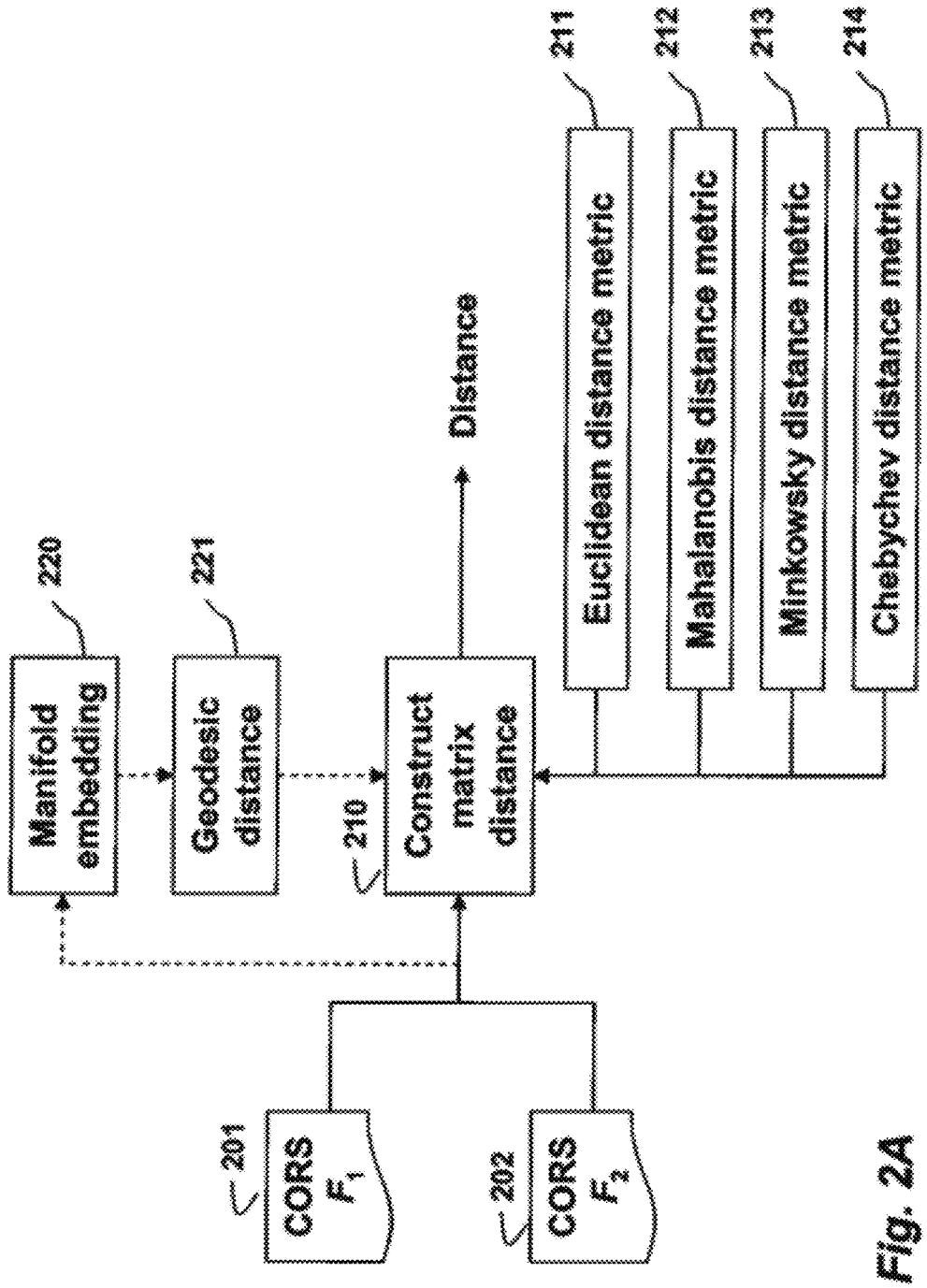
FIG. 2-A is a flow diagram of a method for determining distances between two CORS descriptors according to embodiments of the invention.
FIG. 2B is a flow diagram of a method for matching objects using CORS according to embodiments of the invention.
Figure 2B:
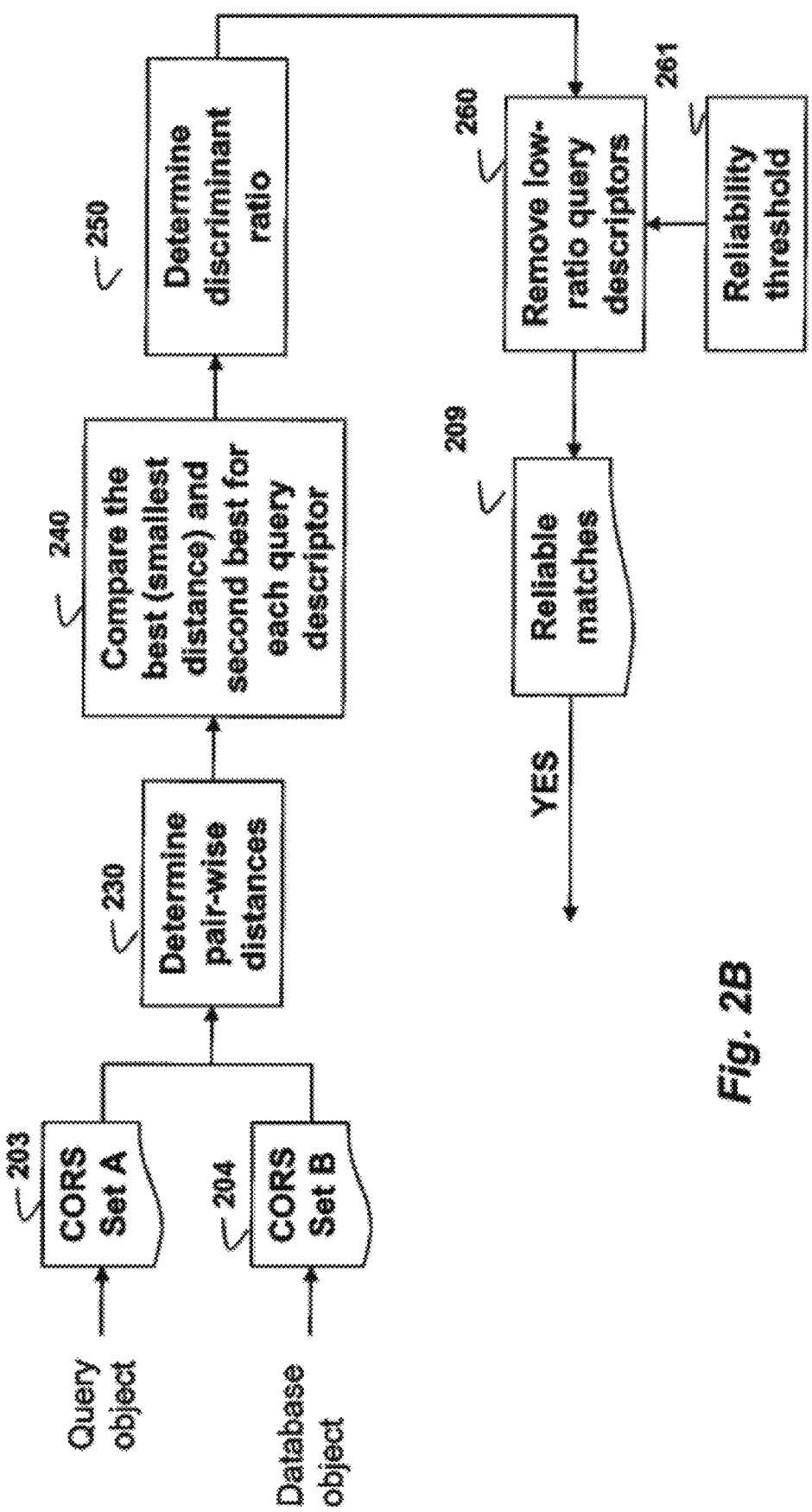

The matching process is shown in FIGS. 2A-2B. First, in FIG. 2A, the dissimilarity between two CURS descriptors $F_1$ 201 and $F_2$ 202 is measured by a matrix distance 210. Matching of CORS descriptors is not limited to Euclidean distance. A manifold embedding 220 can be applied to the descriptors. Because the representation of CORS is in a matrix form, it can be considered to possess a manifold structure where the matching score is defined as the geodesic distance 221 connecting two CURS descriptors on the manifold. In addition, the manifold can be flattened using Isomap 220. Isomap is a well known low-dimensional embedding method, where geodesic distances on a weighted graph are incorporated with conventional scaling. Isomap provides a simple method for estimating the intrinsic geometry of a data manifold based on a rough estimate of each data point's neighbors on a manifold.

In the preferred embodiments, we can use several distance norms.

The Euclidean distance 211 metric is defined as $$dist(F_1, F_2) = \left(\sum_{k,l} [F_1(k, l) - F_2(k, l)]^2\right)^{\frac{1}{2}},$$

where the summation is relative to k, l over all matrix coefficients. The Euclidean distance is the square root of the squared differences between corresponding elements. This is probably the most commonly used distance metric.

The Mahalanobis distance 212 is defined as $$dist(F_1, F_2) = \left(\sum_{k,l} [F_1(k, l) - F_2(k, l)]^T V^{-1} [F_1(k, l) - F_2(k, l)]\right)^{\frac{1}{2}},$$

where $V^{-1}$ is the inverse of the covariance matrix of $F_1$-$F_2$. The Mahalanobis distance is effectively a weighted Euclidean distance, where the weighting is determined by the sample covariance matrix.

The Minkowsky distance 213 is defined as $$dist(F_1, F_2) = \left(\sum_{k,l} [F_1(k, l) - F_2(k, l)]^u\right)^{\frac{1}{u}}.$$

The sum is from k, l=1 to the number of coefficients. The Minkowsky distance is the $u^{th}$ root of the sum of the absolute differences to the $u^{th}$ power between corresponding elements. The Euclidean distance is the special case of u=2.

The Chebychev distance 214 is defined as $$dist(F_1, F_2) = \max |F_1(k,l) - F_2(k,l)|.$$

The dissimilarity measure is mainly dictated by the applications where the invention is used, and the contributions of different bins can be modified accordingly. For example, if the application is to highlight symmetric local structures, CORS, with similar bin values along the azimuth dimension, is weighted significantly higher than the other CORS.

The best match of a query descriptor can be efficiently extracted using approximate nearest neighbor techniques such as k-dimensional trees, and box decomposition tree based search.

The correct matching rate of CORS is approximately 2.5 times higher than that of point signatures. The error rate reduces from 18% for spin image to 12% for CORS, which is more than 33% of improvement.

Discriminant Ratio

Finding descriptor correspondence is essential to many recognition and retrieval problems. It is desirable to have an accurate robust mechanism of filtering out potentially erroneous matches and keeping only the useful ones for further processing. When searching descriptors into a large database or finding correspondences within noisy observations, the nearest neighbor matching results in a large number of incorrect pairs.

To deal with this issue, it is possible to impose a global threshold on the Euclidean distances of the descriptors to their closest matches. However, applying a threshold does not work as most of the less discriminative descriptors tend to have multiple matches with only small distances.

As shown in FIG. 2B, given two sets of CORS descriptors, set A 203 and set B 204, we determine all pair-wise CORS descriptor distances 230 using one of the distance metrics described above for FIG. 2A.

We compare 240 the distance of the best neighbor to that of the second best neighbor. We determine 250 a discriminant ratio dr as a measure for this comparison:

$$\frac{dist_2}{dist_1},$$

where $dist_1$ and $dist_2$ are the Euclidean distances between the set of descriptor of a query object, and first and second best matches of the set of descriptors of another objects in a database, respectively. Higher discriminant ratios require correct matches to have the closest neighbor significantly closer than the closest incorrect matches. As a result, matches with high discriminant ratios tend to be much more reliable. For false matches, there will likely be a number of other false matches within similar distances due to the high dimensionality of the feature space. We remove 260 the pairs of descriptors that have smaller discriminant scores than a reliability threshold 261. The remaining descriptors are used to obtain the reliable matches 209.

Imposing a limit on the discriminant ratio dramatically increases the correct correspondence rate.

Shape Detection and Object Registration

Given a 2.5D range scan query scene the task is to make a reliable decision whether the scene contains the objects of interests. If an instance of the target is detected, either complete or partially occluded, the method estimates the transformation that registers the complete model to the target in the scene. This problem is challenging for several reasons. First, range scan images usually contain hundreds of thousands of points that need to be processed in an efficient yet reliable manner. Second, the target is only partially visible due to the self-occlusion and the cluttering effects, rendering many global shape descriptors useless.

Three main steps of our detection method using CORS, then, can be listed as:

1) Determine CORS for a subset of randomly distributed points in the scene,
2) Find correspondence between the query descriptor of the randomly distributed points and the model descriptor determined off-line, and
3) Iteratively estimate motion parameters with geometric constraints within a RANdom SAmple Consensus (RANSAC) framework to locate and determine a pose of an unknown object.

First, we determine CORS matrices at a random subset of points from the query clouds. These CORS matrices are compared with the predetermined model CORS matrices to find the best and second-best matches. Discriminant ratios are determined and correspondences with this measure less than 1.5 are removed 240. Next, we sample three pairs of matched positions and check if they satisfy all geometric constraints as follows:

$$\min_{i \neq j}\{|q_i - q_j|\} \geq d_{min} \quad i, j = \{1, 2, 3\}$$

$$-\epsilon \leq \|q_1 - q_2| - |m_1 - m_2\| \leq \epsilon$$

$$-\epsilon \leq \|q_2 - q_3| - |m_2 - m_3\| \leq \epsilon$$

$$-\epsilon \leq \|q_3 - q_1| - |m_3 - m_1\| \leq \epsilon$$

$$|(q_1 - q_2) \times (q_2 - q_3)| \geq 2A_{min},$$

where $m_i$ is a point on the object model and $q_i$ is its correspondence on the query scene.

The last constraint effectively forces the triangle's area to be larger than a threshold $A_{min}$. Because a registration error is amplified as moving further away from the triangle, we want to choose a triangle whose area is big enough to limit this source of error.

Now given that we have found three good correspondences, we will discuss briefly how to calculate the rotation matrix R and the translation vector t. The rigid transformation equation is:

$$q_i = Rm_i + t$$

Two additional vertices, $m_4$ and $q_4$, are introduced for the notational convenience:

$$m_4 = m_1 + \frac{(m_2 - m_1) \times (m_3 - m_1)}{|(m_2 - m_1) \times (m_3 - m_1)|}$$

$$q_4 = q_1 + \frac{(q_2 - q_1) \times (q_3 - q_1)}{|(q_2 - m_1) \times (q_3 - m_1)|}$$

R and t are estimated as follows:

$$R = QM^{-1}$$

$$t = \overline{q} - R\overline{m}$$

where $$\overline{m} = \frac{\sum_{i=1}^{4} m_i}{4}$$

$$\overline{q} = \frac{\sum_{i=1}^{4} q_i}{4}$$

-continued $$Q = [q_2 - q_1, q_3 - q_2, q_4 - q_1]$$
$$M = [m_2 - m_1, m_3 - m_2, m_4 - m_1].$$

We incorporate a verification step to prevent the false alarm created by high noise and other type of errors. In this step, the entire model cloud is transformed using the estimated rotation and translation parameters. If the number of overlapping points between the query and the model is more than a threshold, the algorithm acknowledges the presence of the target and registers the entire model to the scene using R and t.

A point is categorized as being overlapped if the distance to its nearest neighbor on the other clouds is smaller than e, which is 2 times the scanner's resolution. In practice, we only need to examine a random subset of point clouds to have a good estimate of the overlapping degree. It is also more practical to disregard regions too far away from the selected vertices because they are likely to belong to other objects.

We are interested in evaluating the recognition rate that is defined as the number of correct detections over the total number of the scenes. An object is said to be correctly detected if the resulting errors of the translation and pose estimations, compared to the ground truth, are smaller than one-tenth of the object's diameter and 12 degrees, respectively.

Our method converges after, on average, only 3 RANSAC iterations. It produces satisfactory estimates of R and t even without any further processing.

Effect of the Invention

The invention provides a concentric ring signature that has high discriminant power and is effective for representing 3D shapes.

The invention also provides a coarse-to-fine method for recognizing and registering objects using point clouds.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for representing a 3D object with a descriptor, wherein a model of the 3D object is a 3D point cloud, comprising the steps of:
    locating a local support for each point p in the 3D point cloud, wherein the local support is a spherical volume S of points $p_i$, centered on the point p and within a radius r of the point p according to $$S = \{p_i : \|p_i - p\| \leq r\},$$

generating reference x, y, and z axes for the local support;
    applying, according to the references x, y, and z axes, a polar grid along an azimuth and a radial directions on an xy plane centered on the point p such that each patch on the grid is a bin for a 2D histogram, wherein the 2D histogram is a 2D matrix F on the grid and each coefficient of the 2D matrix F corresponds to the patch on the grid; and
    estimating, for each grid location (k, l), an elevation value F(k, l) by interpolating the elevation values of the 3D points within the patches to produce the descriptor for the point p, wherein the steps are performed in a processor.

2. The method of claim 1, further comprising:
    fitting a tangent plane P to the local support by least squares so that the tangent plane P is orthogonal to the z-axis; and
    defining a local reference coordinates for the tangent plane to generate the reference x, y, and z axes for the local support so that the descriptor for the local support is invariant of a viewing angle.

3. The method of claim 2, further comprising:
    translating the origin of the plane P at the point p along a normal direction before defining the local reference coordinates.

4. The method of claim 2, further comprising:
    selecting a subset of points along a perimeter of the local support to fit the tangent plane.

5. The method of claim 1, wherein the z-axis is a normal of the local support.

6. The method of claim 1, further comprising:
    matching a first descriptor of a known object with a second descriptor of an unknown object using a matrix distance.

7. The method of claim 6, wherein matrix distance is a Euclidian distance.

8. The method of claim 6, wherein matrix distance is a Mahalanobis Euclidian distance.

9. The method of claim 6, wherein matrix distance is a Minkowsky distance.

10. The method of claim 6, wherein matrix distance is a Chebychev distance.

11. The method of claim 1, where the elevation value F(k, l) is a weighted average of elevation of points surrounding the grid location (k, l).

12. The method of claim 1, where the elevation value F(k, l) is a number of points surrounding the grid location (k, l).

13. The method of claim 1, where the elevation value F(k, l) is a weighted average of the gradient values of points surrounding the grid location (k, l).

14. The method of claim 6, wherein the matching further comprises:
    embedding the first and second descriptors in a manifold, and a matching score is a geodesic distance connecting the first and second descriptors.

15. The method of claim 14, wherein the manifold is flattened.

16. The method of claim 1, further comprising:
    matching the set of descriptors of a query object with the set of descriptors of another object using a discriminant ratio.

17. The method of claim 16, further comprising:
    determining distances between a first descriptor and a second descriptor, wherein the first descriptor is from a query set and the second one is from a database set;
    finding the smallest and the second smallest distance for each descriptor in the query set;
    determining the discriminant ratio for each descriptor in the query set; and
    removing the descriptors from the query set with the discriminant ratios smaller than a reliability threshold;
    using the remaining descriptors to determine the distance between the descriptors of the query set and the database set.

18. The method of claim 1, wherein the descriptor is used for object registration.

19. The method of claim 1, wherein the descriptor is used to locate and determine a pose of an unknown object.

20. A method for representing an object with a descriptor, comprising the steps of:
   locating a local support for each point in a point cloud representing the object;
   generating reference axes for the local support;
   applying, according to the references axes, a polar grid along an azimuth and a radial directions on a plane centered on the point such that each patch on the grid is a bin for a histogram, wherein the histogram is a matrix on the grid, and each coefficient of the matrix corresponds to the patch on the grid; and
   estimating, for each grid location, an elevation value by interpolating the elevation values of the points within the patches to produce the descriptor for the point, wherein the steps are performed in a processor.

* * * * *